United States Patent
Cocchi et al.

(10) Patent No.: US 9,693,571 B2
(45) Date of Patent: Jul. 4, 2017

(54) MACHINE AND METHOD FOR MAKING AND DISPENSING LIQUID, SEMI-LIQUID AND/OR SEMI-SOLID FOOD PRODUCTS

(71) Applicant: ALI S.p.A.—CARPIGIANI GROUP, Milan (IT)

(72) Inventors: Andrea Cocchi, Calderara di Reno (IT); Roberto Lazzarini, Reggio Emilia (IT)

(73) Assignee: ALI S.P.A.—CARPIGIANI GROUP, Milan (IT)

( * ) Notice: Subject to any disclaimer, the term of this patent is extended or adjusted under 35 U.S.C. 154(b) by 0 days.

(21) Appl. No.: 14/892,832

(22) PCT Filed: May 21, 2014

(86) PCT No.: PCT/IB2014/061586
§ 371 (c)(1),
(2) Date: Nov. 20, 2015

(87) PCT Pub. No.: WO2014/188351
PCT Pub. Date: Nov. 27, 2014

(65) Prior Publication Data
US 2016/0113305 A1    Apr. 28, 2016

(30) Foreign Application Priority Data

May 24, 2013   (IT) .............................. BO2013A0260
Feb. 28, 2014   (IT) .............................. BO2014A0098

(51) Int. Cl.
*A23G 9/16*    (2006.01)
*A23G 9/14*    (2006.01)
(Continued)

(52) U.S. Cl.
CPC ............... *A23G 9/14* (2013.01); *A23G 9/16* (2013.01); *A23G 9/163* (2013.01); *A23G 9/166* (2013.01);
(Continued)

(58) Field of Classification Search
CPC ............................................ A23G 9/14–9/305
(Continued)

(56) References Cited

U.S. PATENT DOCUMENTS 2,784,565 A * 3/1957 Stalkup ............... A23G 9/16
62/125
2,961,853 A * 11/1960 Cohrt ................... A23G 9/16
62/303

(Continued)

FOREIGN PATENT DOCUMENTS

| | | |
|---|---|---|
| EP | 0729707 A2 | 9/1996 |
| EP | 2491792 A1 | 8/2012 |
| WO | WO0121007 A1 | 3/2001 |

OTHER PUBLICATIONS

International Search Report and Written Opinion dated Sep. 17, 2014 for related PCT Application No. PCT/IB2014/061586.

*Primary Examiner* — Drew Becker
(74) *Attorney, Agent, or Firm* — Shuttleworth & Ingersoll, PLC; Timothy J. Klima

(57) ABSTRACT

A machine for making and dispensing liquid, semi-liquid and/or semi-solid food products and which includes at least a cylinder for containing and processing basic products, means for heating and cooling the cylinder wrapped around at least part of the cylinder and a mixer unit positioned inside the cylinder which is able to mix the basic products during their processing; the machine also includes a supply duct for supplying the products into the cylinder, a dispensing duct for withdrawing the food products from the cylinder and means for recirculating the products contained in the con-
(Continued)

tainment and processing cylinder which are able to withdraw the products from the cylinder through the dispensing duct and to return them into the cylinder through the supply duct.

26 Claims, 4 Drawing Sheets

(51) Int. Cl.
    *A23G 9/28*         (2006.01)
    *A23G 9/30*         (2006.01)
    *A23G 9/22*         (2006.01)
(52) U.S. Cl.
    CPC ............... *A23G 9/22* (2013.01); *A23G 9/28* (2013.01); *A23G 9/281* (2013.01); *A23G 9/305* (2013.01)
(58) Field of Classification Search
    USPC .................................................. 426/524, 519
    See application file for complete search history.

(56) References Cited

U.S. PATENT DOCUMENTS

| | | | | |
|---|---|---|---|---|
| 2,975,617 A * | 3/1961 | Wakeman | ................ | A23G 9/20 62/342 |
| 3,989,492 A * | 11/1976 | Keyes | ................... | A23G 9/045 366/262 |
| 4,625,525 A * | 12/1986 | Bradbury | ............... | A23G 9/045 62/330 |
| 4,680,944 A * | 7/1987 | Menzel | .................. | A23G 9/163 165/61 |
| 4,964,542 A * | 10/1990 | Smith | ...................... | A23G 9/04 222/146.6 |
| 5,016,446 A * | 5/1991 | Fiedler | ................... | A23G 9/163 222/146.6 |
| 5,615,559 A * | 4/1997 | Kress | ...................... | A23G 9/16 62/136 |
| 5,692,392 A * | 12/1997 | Swier | ..................... | A23G 9/045 222/146.6 |
| 6,142,340 A * | 11/2000 | Watanabe | ............ | B67D 1/0007 222/129.3 |
| 7,640,755 B1 * | 1/2010 | Kateman | .................. | A23G 9/08 222/52 |
| 2004/0003620 A1 * | 1/2004 | Cocchi | .................... | A23G 9/22 62/348 |
| 2004/0251270 A1 * | 12/2004 | Davis | ..................... | A23G 9/281 222/2 |
| 2006/0024418 A1 * | 2/2006 | White | ..................... | A23G 9/14 426/565 |
| 2006/0243310 A1 * | 11/2006 | Cocchi | ................... | A23G 9/045 134/134 |
| 2006/0261086 A1 * | 11/2006 | Schroeder | ............... | A23G 9/28 222/66 |
| 2007/0114228 A1 * | 5/2007 | Cocchi | .................... | A23G 9/08 219/679 |
| 2010/0101235 A1 * | 4/2010 | Cocchi | .................... | A23G 9/16 62/1 |
| 2012/0251697 A1 * | 10/2012 | Cocchi | .................. | A23G 9/045 426/521 |
| 2013/0064034 A1 * | 3/2013 | Almblad | ............... | A47J 43/046 366/205 |
| 2015/0245634 A1 * | 9/2015 | Lazzarini | ............... | A23G 9/045 366/142 |

* cited by examiner

MACHINE AND METHOD FOR MAKING AND DISPENSING LIQUID, SEMI-LIQUID AND/OR SEMI-SOLID FOOD PRODUCTS

This application is the National Phase of International Application PCT/IB2014/061586 filed May 21, 2014 which designated the U.S. and that International Application was published under PCT Article 21(2) in English.

This application claims priority to Italian Patent Application No. BO2013A000260 filed May 24, 2013, and Italian Patent Application No. BO2014A000098 filed Feb. 28, 2014, which applications are incorporated by reference herein.

TECHNICAL FIELD

This invention relates to a machine and a method for making and dispensing liquid, semi-liquid and/or semi-solid food products such as, for example, soft ice cream and the like.

More specifically, this invention relates to machines for making and dispensing soft ice cream where the basic products are contained in sealed containers, such as, for example, containment tanks or containers of the type known as "bag in box".

BACKGROUND ART

Generally speaking, machines for making and dispensing ice cream of this kind comprises a tank for containing the basic products, into which the liquid or semi-liquid ingredients (that is, the liquid or semi-liquid basic products) are fed and where the selfsame basic products are processed.

The containment tank internally comprises a mixer for the basic products which guarantees that the basic products are mixed continuously during processing.

The tank is wrapped in coils through which a heat exchange fluid is made to flow. The heat exchange fluid heats or cools the tank and, consequently, the products therein, according to set thermal cycles.

More specifically, during a thermal cycle for pasteurizing the basic products inside the containment tank, the heat exchange fluid heats the containment tank and, consequently, the products therein to temperatures of between 65° and 85° C.

During this thermal cycle, the mixer continuously stirs the products being processed so that the end product has a smooth, homogeneous consistency.

When the pasteurization cycle is over, the product in the tank is cooled and brought to a temperature of around 4° C. suitable for its storage, thereby obtaining the ice cream.

During the product cooling and storage cycle, the heat exchange fluid cools the containment tank and, consequently, the products therein.

In the ice cream production sector, it is known that good and well carried out pasteurization makes a product of high quality.

In machines of known type, as described above, however, it has been found that during the pasteurization of the basic products inside the containment tank, the product in contact with the tank walls, and more specifically, the walls around which the coils for the heat exchange fluid are wrapped, tends to become very hot, despite the continuous action of the mixer.

Localized burning of the basic product may lead to the formation of lumps in the product, which negatively affect the quality of the basic product being processed in terms of smooth, homogeneous consistency, thus producing a poorer quality ice cream.

DISCLOSURE OF THE INVENTION

The aim of this invention is to overcome the above mentioned disadvantage.

According to the invention, this aim is achieved by a machine and a method for making and dispensing liquid, semi-liquid and/or semi-solid food products.

BRIEF DESCRIPTION OF THE DRAWINGS

The technical features, with reference to the above aim, are clearly described herein and the advantages are apparent from the detailed description which follows, with reference to the accompanying drawings which illustrate a non-limiting example embodiment and in which.

DETAILED DESCRIPTION OF PREFERRED EMBODIMENTS OF THE INVENTION

Figure 1:
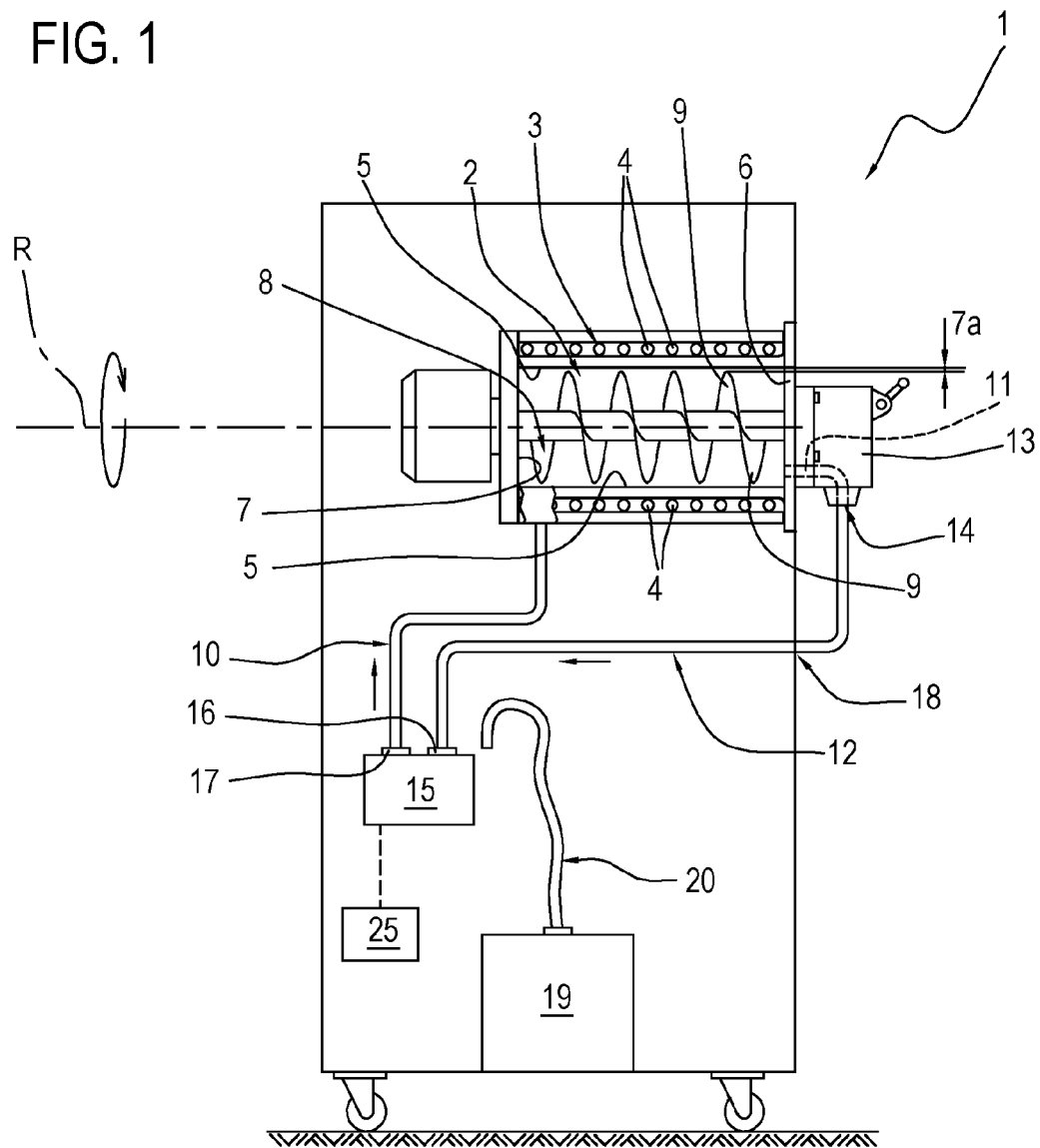
FIG. 1 shows a schematic front view of the machine of the invention according to a first embodiment thereof.

With reference to FIGS. 1 to 4, the numeral 1 denotes a machine for making and dispensing liquid, semi-liquid and/or semi-solid food products such as, for example, soft ice cream and the like.

Preferably, the machine 1 is used to make ice cream (or similar products) and, more specifically what is generally known as "soft ice cream".

The machine 1 comprises a cylinder 2 for containing and processing basic products, means 3 for heating and cooling the cylinder 2, wrapped around at least part of the cylinder 2.

Since the basic product is processed in the containment and processing cylinder 2 until it has the consistency of ice cream, the cylinder 2 also acts as a mixing and cooling cylinder.

The heating and cooling means 3 comprise coils 4 in which a heat exchange fluid flows.

More precisely, the cylinder 2 has a leading end wall 6, a trailing end wall 7 and a perimeter side wall 5 joining the trailing end wall 7 to the leading end wall 6.

Preferably, the heating and cooling means 3 are wrapped around at least part of the side wall 5 of the cylinder 2.

The machine 1 comprises a mixer unit 8 positioned inside the cylinder 2 and able to mix the basic products while they are being processed.

The mixer unit 8 rotates about its axis of rotation R.

More specifically, the axis R is horizontal.

In an alternative embodiment not illustrated, the cylinder 2 defines a tank for containing and processing the basic products and internally comprising a mixer unit 8 which rotates about its axis of rotation R which, in this case, is vertical.

The mixer unit 8 comprises one or more blades 9 which extend in a direction substantially transversal to the axis of rotation R of the mixer 8 itself.

Preferably, the blades 9 extend towards the side wall 5 of the cylinder 2 in such a way as to define a clearance gap 7a for the basic products to pass through.

Preferably, the clearance gap 7a is limited in cross section size so as to prevent the basic product from sticking to the side wall 5 of the cylinder 2 during processing.

The machine 1 comprises at least a supply duct 10 for supplying the products into the containment and processing cylinder 2 and at least a dispensing duct 11 for withdrawing the food products from the cylinder 2.

The supply duct 10 and the dispensing duct 11 extend from the cylinder 2 and outwardly therefrom.

Preferably, the supply duct 10 and the dispensing duct 11 extend from the side wall 5 and from the leading end wall 6 of the cylinder 2, respectively.

Alternatively, both the supply duct 10 and the dispensing duct 11 extend from the side wall 5 of the cylinder 2.

According to the invention, the machine 1 comprises means 12 for recirculating the products contained in the containment and processing cylinder 2 which is able to withdraw the products from the cylinder 2 through the dispensing duct 11 and to return them into the cylinder 2 through the supply duct 10.

Advantageously, in addition to the action of the mixer unit 8, the recirculation means 12 apply a further stirring action to the basic products inside the processing cylinder 2.

This prevents the basic products being processed in the cylinder 2 from sticking to the wall 5 thereof, especially during high temperature cycles such as, for example, the pasteurization cycle.

According to the invention, the machine comprises a removable container 19 for feeding basic products and provided with a product infeed channel 30 and a product outfeed channel 31.

Figure 4:
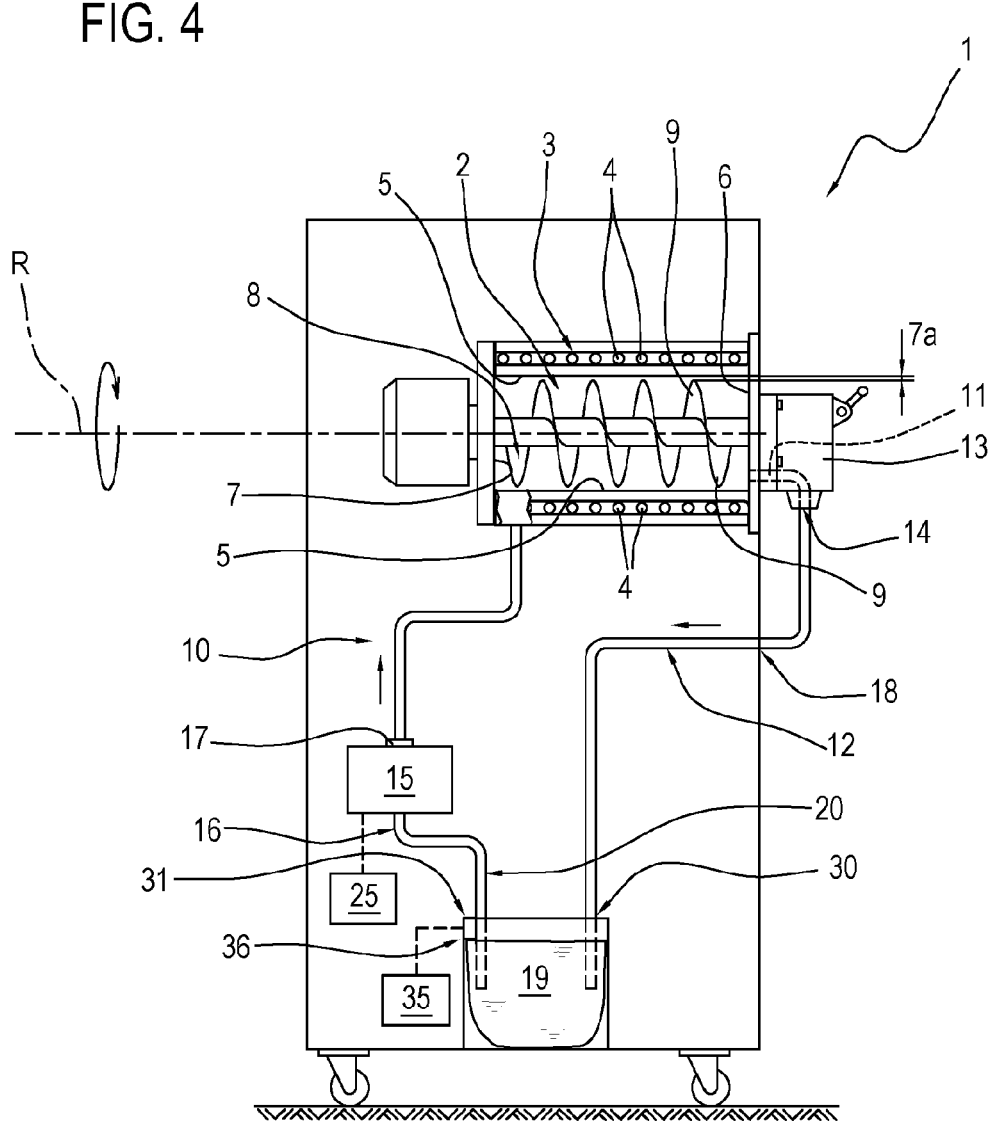
FIG. 4 shows a schematic front view of the machine of the invention according to a fourth embodiment thereof.

This container is preferably a container of the type known as "bag in box" (as illustrated in FIG. 4).

The infeed channel 30 is connected, in use, to the dispensing duct 11 and the outfeed channel 31 is connected, in use, to the supply duct 10 in order to allow recirculating the product between the containment cylinder 2 and the removable container 19.

That way, recirculation is effected between the containment cylinder 2 and the removable container 19 so that the contents of the removable container 19 undergo what is known as "recycling" pasteurization.

That means it is not necessary to disconnect the removable container 19 from the machine (that is, from the cylinder 2) to allow the basic mix inside the removable container 19 to be pasteurized.

The machine 1 comprises a dispensing tap 13 for withdrawing the food products from the cylinder 2. The tap 13 has a product dispensing outlet 14.

The dispensing tap 13 is connected to the dispensing duct 11 of the cylinder 2.

In the second embodiment, the recirculation means 12 for recirculating the products contained in the cylinder 2 withdraw the products from the cylinder 2 through the dispensing duct 11 and return them into the cylinder 2 through the supply duct 10.

The recirculation means 12 comprise a pump 15 having an infeed section 16 and a delivery section 17.

Advantageously, the pump 15 is a peristaltic pump.

Preferably, recirculation performed by the recirculation means 12 is continuous.

Preferably, in the embodiment illustrated in FIG. 4, the recirculation means 12 perform continuous recirculation between the removable container 19 and the cylinder 2.

Alternatively, recirculation performed by the recirculation means is intermittent.

The continuous or intermittent recirculation mode depends on the operating mode of the pump 15.

In the embodiment illustrated in FIG. 1, the delivery section 17 is connected to the supply duct 10 and the infeed section 16 is connected to the dispensing duct 11.

In a first variant embodiment, the infeed section 16 is connected to the dispensing duct 11 through the dispensing tap 13, in particular through the dispensing outlet 14 thereof, as illustrated in FIG. 1.

Figure 2:
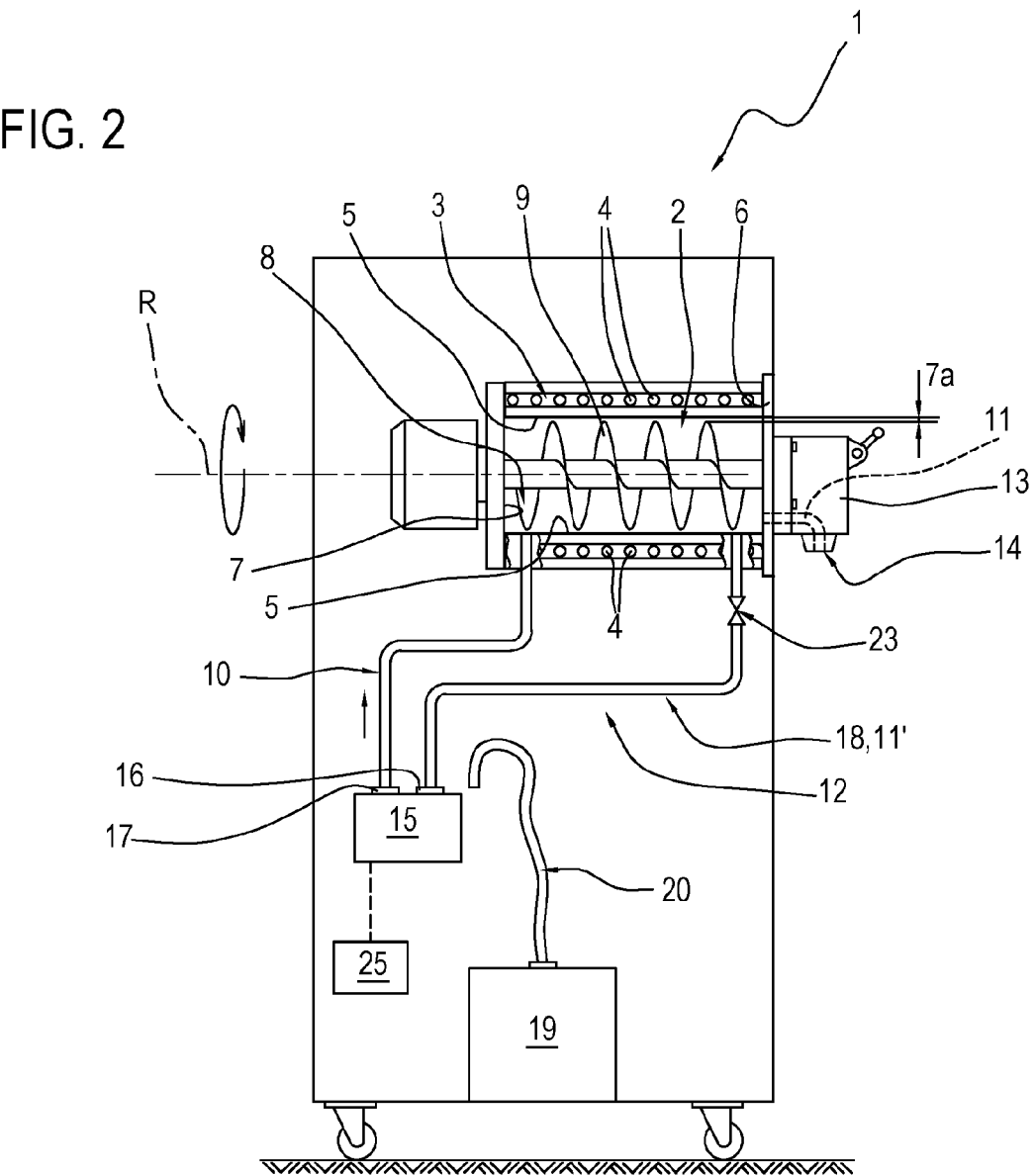
FIG. 2 shows a schematic front view of the machine of the invention according to a second embodiment thereof.

In a second variant embodiment, the infeed section 16 is connected directly to the dispensing duct 11, as illustrated in FIG. 2.

Advantageously, the machine 1 comprises a duct 18 for connecting the infeed section 16 of the pump 15 to the dispensing duct 11.

In the second embodiment, illustrated in FIG. 2, the connecting duct 18 leads into the cylinder 2, more specifically through the perimeter side wall 5.

In this embodiment, the connecting duct 18 comprises a shutoff valve 23 capable of opening the duct 18, during recirculation of the basic products.

In this embodiment, the connecting duct 18 acts as dispensing duct 11'.

It should be noted that in soft ice cream machines, the basic products to be fed into the cylinder 2 to make the ice cream are stored in dedicated containers 19.

Preferably, but not necessarily, the containers 19 are of the "bag in box" type, that is to say, they consist of a hard container and a soft container placed inside the hard container and containing the basic products.

The machine 1 comprises a duct 20 for sucking in the basic products to be fed into the containment and processing cylinder 2.

The pump 15 is designed to withdraw the basic products from the container 19 through the suction duct 20 and to transfer the same into the containment and processing cylinder 2 through the supply duct 10.

According to the invention, the infeed section 16 of the pump 15 is connectable to the suction duct 20 and to the dispensing duct 11 of the cylinder 2, alternately.

The connection between the infeed section 16 of the pump 15 and the suction duct 20 and dispensing duct 11 changes as a function of the steps in the ice cream production process.

More specifically, to transfer the basic products from the container 19 to the cylinder 2 by means of the pump 15, the infeed section 16 of the pump 15 is connected to the suction duct 20.

During the cycle when the basic products in the cylinder 2 are pasteurized, the infeed section 16 of the pump 15 is connected to the dispensing duct 11.

Figure 3:
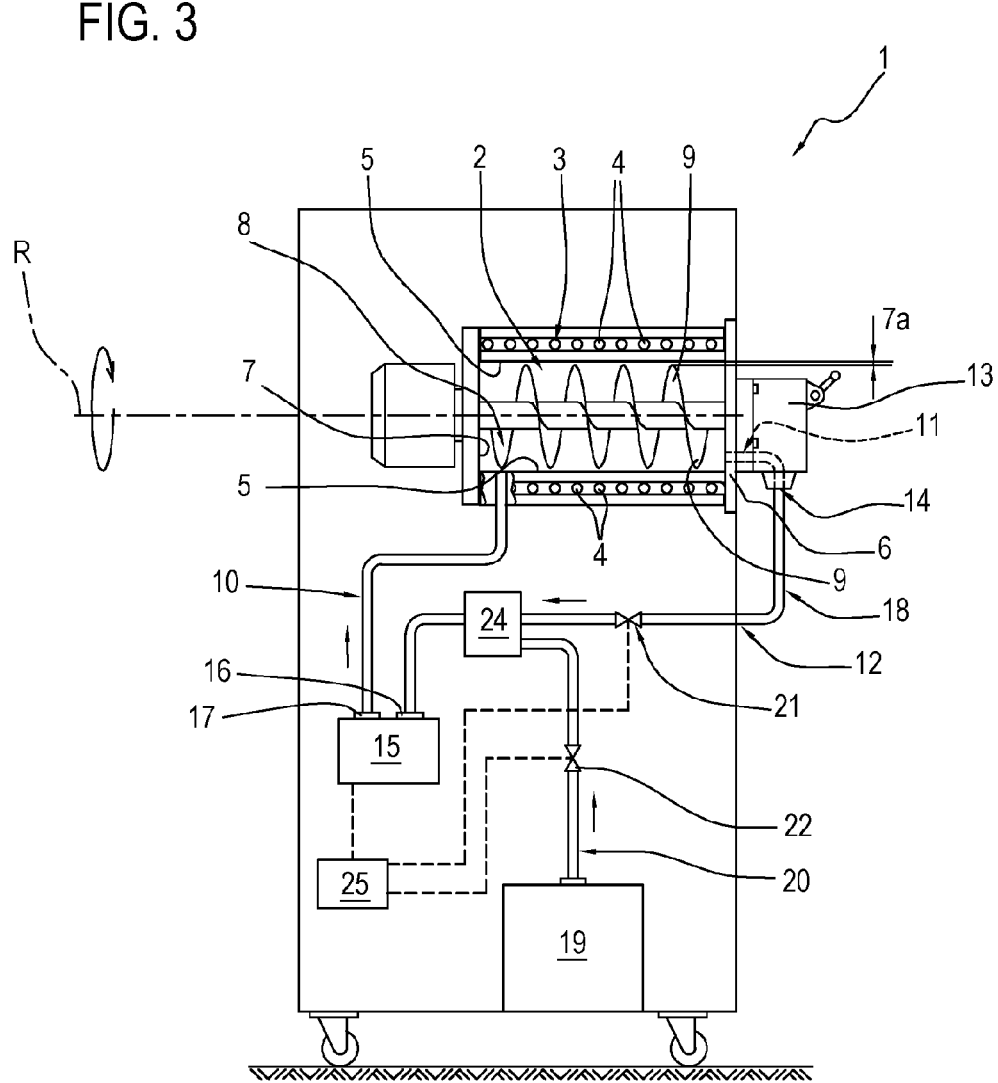
FIG. 3 shows a schematic front view of the machine of the invention according to a third embodiment thereof.

In a third embodiment, illustrated in FIG. 3, the pump 15 comprises a common by-pass section 24 upstream of the infeed section 16 and connected thereto.

The connecting duct 18 and the suction duct 20 merge into the common by-pass section 24.

The connecting duct 18 and the suction duct 20 are equipped with a first and a second shutoff valve 21 and 22, respectively.

In this embodiment, acting on the first shutoff valve 21 causes the connecting duct 18 to close, so that the pump 15 sucks the basic products through the suction duct 20 and fills the cylinder 2 through the supply duct 10.

Once the cylinder 2 is full, the suction duct 20 can be closed by acting on the second shutoff valve 22 and the connecting duct 18 can be opened by acting on the first shutoff valve 21.

The machine 1 comprises a control unit 25 logically connected to the first and second shutoff valves 21 and 22 and capable of opening and closing these valves 21 and 22 during the operation of the machine 1.

That way, the pump 15 recirculates the products inside the cylinder 2 by withdrawing them through the dispensing duct 11 and returning them into the cylinder through the supply duct 10, preferably continuously.

In use, the pump 15 transfers the basic products from the container 19 to the tank 2 (that is, the cylinder 2) until the latter is full.

When the cylinder 2 is full, the products inside the cylinder 2 itself (and, in the embodiment illustrated in FIG. 4, the basic products inside the container 19) undergo the pasteurization cycle.

During the pasteurization cycle, the recirculation means 12 withdraw the products being processed from the cylinder 2 through the dispensing duct 11 and return them into the cylinder 2 through the supply duct 10. This prevents the products being processed from sticking to the walls 5, 6 and 7 of the cylinder 2 which reach temperatures between 65° and 85° C.

More specifically, the recirculation means 12 stop the products being processed from sticking to the walls 5, 6, 7 of the cylinder 2, wrapped in the heating and cooling means 3, in particular the side wall 5.

The recirculation means 12 also stop the products being processed from sticking to the leading end wall 6 and the trailing end wall 7 of the cylinder 2.

The recirculation means 12 apply a stirring action to the products being processed, added to the stirring action applied by the mixer unit 8.

More specifically, in the embodiment illustrated in FIG. 4, the recirculation means 12 withdraw the products from the removable container 19 and make them recirculate through the cylinder 2 (preferably by means of a pump 15).

Advantageously, the contents of the removable container 19 can thus be pasteurized without disconnecting the container from the cylinder 2.

When the pasteurization cycle is over, the products being processed undergo a cooling cycle and a storage cycle, thus obtaining a finished product, that is, ice cream, from the basic products.

The pump 15 is activated by a control unit 25 as a function of the operating cycle of the machine 1.

During the cooling and storage cycle, the heating and cooling means 3 cause the heat exchange fluid to flow in the coils 4 in order to remove heat from the cylinder 2, thereby cooling it.

Usually, the heating and cooling means 3 cool the cylinder 2 to a temperature of around 4° C. which is also the ice cream storage temperature.

At this point, the ice cream inside the cylinder 2 can be withdrawn through the dispensing tap 13.

According to another aspect, the machine 1 comprises a memory designed to save a piece of information relating to the opening time of the removable container 19.

The term "opening time" is used to denote a piece of time information indicating when the removable container 19 was opened, that is to say, when it was first used in the machine.

For example, the piece of time information may comprise one or more of the following pieces of information:

the date the removable container 19 was opened;

the time the removable container 19 was opened;

the interval of time elapsed since the removable container 19 was opened.

In effect, it should be noted that the infeed channel 30 and the outfeed channel 31 are initially closed: they are opened (perforated) when the removable container is used for the first time in the machine 1.

According to this aspect, it should be noted that the machine comprises a memory control unit 35 (which may or may not form part of the control unit 25 of the machine) configured to measure the time the removable container 19 is connected to the cylinder 2.

The control unit 35 updates the opening time information when the removable container 19 is connected to the cylinder 2 for the first time (for example, saving the date and/or the time of opening or starting a time count indicating the length of time elapsed since the container 19 was opened).

Also according to this aspect, the control unit 35 is è configured to provide an indication if the opening time of the removable container 19 in the machine is greater than a preset value (this value preferably corresponding to 24 hours or 72 hours).

It should be noted that the preset value is such that if the product inside the removable container 19 is used—for making the finished product—within this preset value, no food safety risk arises.

The preset value is thus selected to guarantee the food safety of the product made by the machine 1.

According to this aspect, the machine 1 comprises an indication unit (for example, a display or sound means) connected to the control unit 35 to provide an indication (visible and/or audible) if the opening time of the removable container 19 in the machine is greater than a preset value (also saved in the control unit 35 or in the memory itself).

Preferably, the control unit 35 comprises a sensor 36 for detecting when the removable container 19 is connected to the cylinder 2.

Preferably, in one embodiment, the control unit 35 comprises a level sensor for detecting the level of product in the removable container 19 and for establishing, based on the level detected, when said removable container 19 is connected to the cylinder 2 (in such a way as to update the opening time in the memory, if the removable container 19 is connected for the first time to the machine 1, that is, to the cylinder 2.

In another embodiment, the machine 1 comprises a connector for connecting the removable container 19 to the cylinder 2.

Preferably, the connector is configured to be connected to the infeed channel 30 and to the outfeed channel 31 of the removable container 19.

According to this aspect, the control unit 35 comprises a sensor, associated with the connector or with the removable container 19, for detecting a connection of the removable container 19 to the connector corresponding to a condition of connection of the removable container 19 to the cylinder 2.

Also defined according to the invention is a method for making and dispensing liquid, semi-liquid and/or semi-solid food products starting from basic products.

The method comprises:

a step of preparing at least a cylinder 2 for containing and processing basic products, means 3 for heating and cooling the cylinder 2, wrapped around at least part of the cylinder 2, and a mixer unit 8 positioned inside the cylinder 2 which is able to mix the basic products during their processing;

a step of preparing at least a supply duct 10 for supplying the products into the cylinder 2 and at least a dispensing duct 11 for withdrawing the food products from the cylinder 2;

a step of recirculating the products contained in the containment and processing cylinder 2.

It should be noted that the recirculating step comprises a step of withdrawing the products from the cylinder 2 through the dispensing duct 11, 11' and a step of returning them into the cylinder 2 through the supply duct 10.

The method, for the embodiment shown in FIG. 4, comprises:

a step of preparing at least a cylinder 2 for containing and processing basic products, means 3 for heating and cooling the cylinder 2, wrapped around at least part of the cylinder 2, and a mixer unit 8 positioned inside the cylinder 2 which is able to mix the basic products during their processing;

a step of preparing a removable container 19 for feeding basic products and provided with an infeed channel 30 and an outfeed channel 31;

a step of preparing at least a supply duct 10 for supplying the products into the cylinder 2 and at least a dispensing duct 11 for withdrawing the food products from the cylinder 2, the method being characterized in that it comprises at least in use a step of recirculating the products contained in the containment and processing cylinder 2;

a step of withdrawing the products from the cylinder 2 through the dispensing duct 11, 11';

a step of returning the products into the cylinder 2 through the supply duct 10;

a step of connecting the infeed channel 30 of the removable container 19 to the dispensing duct 11, 11' and connecting the outfeed channel 31 of the removable container 19 to the supply duct 10 to allow recirculating the product between the containment cylinder 2 and the removable container 19;

a step of recirculating the products between the containment cylinder 2 and the removable container 19 through the dispensing duct 11, 11', the supply duct 10, the infeed channel 30 and the outfeed channel 31.

The method comprises the step of transferring the basic products (from the removable container 19) into the containment and processing cylinder 2 followed by the step of recirculating the products inside the containment and processing cylinder 2 (between the cylinder 2 and the container 19 in the embodiment shown in FIG. 4).

Preferably, the step of recirculating the products between the containment and processing cylinder 2 and the removable container 19 is performed continuously, for a preset time interval.

The method relating to FIG. 4 comprises a step of preparing a removable container 19 for feeding the basic products and provided with an infeed channel 30 and an outfeed channel 31.

Preferably, the removable container 19 is of the type known as "bag in box".

It should be noted that if the basic products are in containers 19 of the "bag in box" type, when the step of transferring the basic products into the containment and processing cylinder 2 is over, the method comprises a step of disconnecting the suction duct 20 from the container 19.

That means, advantageously, that the container 19 can be kept separately from the machine 1.

Advantageously, therefore, the container 19 can be stored in a refrigerator to allow the basic product to be stored for re-use at a later stage. The recirculating step comprises a step of withdrawing the products from the cylinder 2 through the dispensing duct 11 and a step of returning them into the cylinder 2 through the supply duct 10.

Alternatively, the step of recirculating the products contained in the containment and processing cylinder 2 comprises the step of withdrawing the products from the cylinder 2 through the dispensing tap 13 and the step of returning them into the cylinder 2 through the supply duct 10.

The step of recirculating the products contained in the containment and processing cylinder 2 is preferably performed during the pasteurization cycle of the basic products.

This method comprises a step of connecting the recirculation means 12 to the supply duct 10 and to the dispensing duct 11 of the containment and processing cylinder 2, defining a circuit for the recirculation of the products inside the cylinder 2.

More specifically, the method comprises a step of disconnecting the infeed section 16 of the pump 15 from the container 19 of the basic products and connecting the infeed section 16 of the pump 15 to the dispensing duct 11 by means of at least one connecting duct 18.

To disconnect the infeed section 16 of the pump 15 from the container 19 the method comprises a step of disconnecting the suction duct 20 from the infeed section 16 of the pump 15.

Thus, in this step, the container 19 and the related suction duct 20 are detached from the pump 15.

If necessary, the container 19 and the related suction duct 20 can be kept separately from the machine 1. Alternatively, the method comprises a step of disconnecting the infeed section 16 of the pump 15 from the suction duct 20 of the basic products and connecting the infeed section 16 of the pump 15 to the dispensing tap 13 by means of at least one connecting duct 18. More specifically, the infeed section 16 of the pump 15 is connected to the dispensing outlet 14 of the dispensing tap 13.

According to another aspect, the method comprises:

a step of saving a piece of time information (opening time) indicating when the removable container 19 was opened;

a step of comparing said piece of time information saved with a preset value, for providing an indication if the time interval since opening is greater than the preset value.

According to this aspect, the method preferably comprises a step of detecting, by means of a sensor, when the removable container 19 is connected to the cylinder 2.

Advantageously, according to this aspect, it is possible to know at any time when the container was opened (that is, the time elapsed since opening): thus, the machine user knows immediately how long the removable container has been open and, based on this knowledge, can decide whether to dispose of the removable container 19 or use up its contents before they spoil.

Advantageously, during the pasteurization cycle, the basic products are stirred by the mixer unit 8 and recirculated by the recirculation means 12, thereby preventing them from sticking to the walls of the cylinder 2, in particular the side wall 5 in contact with the coils 4, and consequently the products being processed are prevented from burning.

That means the machine 1 produces a better quality ice cream than prior art machines because the recirculation means 12 improve the homogenization of the basic product mix during pasteurization.

Described below are some aspects applicable to one or more of the embodiments of the machine or of the method described above.

According to another aspect, the machine comprises an indication unit, connected to the control unit 35 for providing an indication when the removable container 19 has been open for a length time, calculated starting from the opening time saved in the memory, greater than a preset value.

According to yet another aspect, the control unit 35 comprises a level sensor for detecting the level of product in the removable container 19 and for establishing, based on the level detected, when said removable container 19 is connected to the cylinder 2.

The invention claimed is:

1. A machine for making and dispensing at least one chosen from liquid, semi-liquid and semi-solid food products, comprising:
   a container of basic products;
   a cylinder for containing and processing the basic products into at least one chosen from liquid, semi-liquid and semi-solid food products,
   a system for heating and cooling the cylinder wrapped around at least part of the cylinder;
   a mixer unit positioned inside the cylinder for mixing the basic products during the processing of the basic products;
   a supply duct for supplying the basic products into the cylinder;
   a dispensing duct for withdrawing the food products from the cylinder;
   a recirculation system for recirculating at least one chosen from the basic products and the food products, the recirculation system including a pump including an infeed section and a delivery section; the infeed section being connectable to the dispensing duct to withdraw the at least one chosen from the basic products and the food products from the cylinder and the delivery section being connectable to the supply duct to return the at least one chosen from the basic products and the food products to the cylinder;
   a suction duct for sucking the basic products from the container into the cylinder; the infeed section of the pump being connectable alternately to the suction duct and to the dispensing duct of the containment cylinder.

2. The machine according to claim 1, wherein the container is a removable container for feeding the basic products, including a product infeed channel and a product outfeed channel, said infeed channel being operationally connected, in use, to the dispensing duct and said outfeed channel being operationally connected, in use, to the supply duct for allowing recirculation between the cylinder and said removable container through said infeed channel, outfeed channel, dispensing duct and supply duct.

3. The machine according to claim 2, comprising:
   a memory configured to save a piece of information relating to an opening time of the removable container; and
   a control unit for said memory configured and programmed to detect when said removable container is connected to the cylinder and to update the piece of information relating to the opening time when said removable container is connected to the cylinder for a first time.

4. The machine according to claim 3, wherein the control unit is configured to provide an indication if an open interval of the removable container, calculated starting from the opening time saved in the memory, is greater than a preset value.

5. The machine according to claim 4, comprising an indication unit, connected to the control unit for providing an indication if an open interval of the removable container, calculated starting from the opening time saved in the memory, is greater than a preset value.

6. The machine according to claim 3, wherein the control unit comprises a sensor for detecting when said removable container is connected to the cylinder.

7. The machine according to claim 3, wherein the control unit comprises a level sensor for detecting a level of product in the removable container and for establishing, based on the level detected, when said removable container is connected to the cylinder.

8. The machine according to claim 3, comprising:
   a connector for connecting said removable container to the cylinder, and
   wherein the control unit comprises a sensor, associated with said connector or with the removable container, for detecting a connection of the removable container to said connector corresponding to a condition of connection of said removable container to the cylinder.

9. The machine according to claim 1, and further comprising:
   a dispensing tap for withdrawing the at least one chosen from the basic products and the food products from the cylinder;
   the infeed section being connected to the dispensing tap for withdrawing the at least one chosen from the basic products and the food products from the cylinder;
   the delivery section being connected to the supply duct for returning the at least one chosen from the basic products and the food products into the cylinder.

10. The machine according to claim 9, wherein the infeed section is connected to the dispensing duct through a dispensing outlet of the dispensing tap.

11. The machine according to claim 1, wherein the infeed section is connected to the dispensing duct and the delivery section is connected to the supply duct.

12. The machine according to claim 11, and further comprising a duct connecting the infeed section of the pump to the dispensing duct.

13. The machine according to claim 1, wherein the system for heating and cooling the cylinder includes a coolant channel wrapped around at least part of the cylinder.

14. A method for making and dispensing at least one chosen from liquid, semi-liquid and semi-solid food products, comprising:
   providing a container of basic products,
   providing a cylinder for containing and processing the basic products into at least one chosen from liquid, semi-liquid and semi-solid food products,
   providing a system for heating and cooling the cylinder, wrapped around at least part of the cylinder,
   providing a mixer positioned inside the cylinder for mixing the basic products during the processing of the basic products;
   providing a supply duct for supplying the basic products into the cylinder,
   providing a dispensing duct for withdrawing the food products from the cylinder,
   recirculating at least one chosen from the basic products and the food products by withdrawing the at least one chosen from the basic products and the food products from the cylinder through the dispensing duct and returning the at least one chosen from the basic products and the food products into the cylinder through the supply duct;
   providing a pump having an infeed section connected to the container and a delivery section connected to the cylinder, disconnecting the infeed section from the container, and connecting the infeed section to the dispensing duct using at least one connecting duct.

15. The method according to claim 14, and further comprising:
providing a dispensing tap connected to the dispensing duct,
wherein the recirculating the at least one chosen from the basic products and the food products includes withdrawing the at least one chosen from the basic products and the food products from the cylinder through the dispensing tap and returning the at least one chosen from the basic products and the food products into the cylinder through the supply duct.

16. The method according to claim 15, and further comprising connecting the infeed section to the dispensing tap using at least one connecting duct.

17. The method according to claim 14, and further comprising:
pasteurizing the at least one chosen from the basic products and the food products, and
wherein the recirculating the at least one chosen from the basic products and the food products is performed simultaneously with the pasteurizing the at least one chosen from the basic products and the food products.

18. The method according to claim 14, wherein the recirculating the at least one chosen from the basic products and the food products is performed continuously.

19. The method according to claim 14, comprising:
providing that the container is a removable container that includes an infeed channel and an outfeed channel,
connecting the infeed channel of the removable container to the dispensing duct and connecting said outfeed channel of the removable container to the supply duct for allowing recirculation between said cylinder and said removable container;
recirculating the at least one chosen from the basic products and the food products between the cylinder and said removable container through the dispensing duct, the supply duct, the infeed channel and the outfeed channel.

20. The method according to claim 19, wherein the recirculating the at least one chosen from the basic products and the food products between the cylinder and the removable container is performed continuously, for a preset time interval.

21. The method according to claim 19, and further comprising connecting the infeed section to one of either the dispensing duct or the outfeed channel of the removable container and connecting the delivery section to one of either the supply duct or the infeed channel of the removable container, to allow circulation between the containment cylinder and said removable container through at least one chosen from said dispensing duct and the outfeed channel and at least one chosen from the supply duct and the outfeed channel.

22. The method according to claim 19, comprising;
saving a piece of time information indicating when the removable container was opened;
comparing said saved piece of time information with a preset value, to indicate if a time interval since opening is greater than the preset value.

23. The method according to claim 22, and further comprising detecting, using a sensor, connection of the removable container to the cylinder.

24. The method according to claim 14, and further comprising providing the system for heating and cooling the cylinder with a coolant channel wrapped around at least part of the cylinder.

25. A machine for making and dispensing at least one chosen from liquid, semi-liquid and semi-solid food products, comprising:
a cylinder for containing and processing basic products into at least one chosen from liquid, semi-liquid and semi-solid food products,
a system for heating and cooling the cylinder wrapped around at least part of the cylinder;
a mixer unit positioned inside the cylinder for mixing the basic products during the processing of the basic products;
a supply duct for supplying the basic products into the cylinder;
a dispensing duct for withdrawing the food products from the cylinder;
a recirculation system for recirculating at least one chosen from the basic products and the food products, the recirculation system being connectable to the dispensing duct to withdraw the at least one chosen from the basic products and the food products from the cylinder and also being connectable to the supply duct to return the at least one chosen from the basic products and the food products to the cylinder;
a removable container for feeding the basic products, the removable container including a product infeed channel and a product outfeed channel, the product infeed channel being connected to the dispensing duct and the product outfeed channel being connected to the supply duct for recirculation between the cylinder and the removable container through the product infeed channel, product outfeed channel, dispensing duct and supply duct.

26. A method for making and dispensing at least one chosen from liquid, semi-liquid and semi-solid food products, comprising:
providing a container of basic products,
providing a cylinder for containing and processing the basic products into at least one chosen from liquid, semi-liquid and semi-solid food products,
providing a system for heating and cooling the cylinder, wrapped around at least part of the cylinder,
providing a mixer positioned inside the cylinder for mixing the basic products during the processing of the basic products;
providing a supply duct for supplying the basic products into the cylinder,
providing a dispensing duct for withdrawing the food products from the cylinder,
recirculating at least one chosen from the basic products and the food products by withdrawing the at least one chosen from the basic products and the food products from the cylinder through the dispensing duct and returning the at least one chosen from the basic products and the food products into the cylinder through the supply duct;
providing that the container is a removable container that includes an infeed channel and an outfeed channel,
connecting the infeed channel of the removable container to the dispensing duct and connecting the outfeed channel of the removable container to the supply duct for allowing recirculation between the cylinder and the removable container;

recirculating the at least one chosen from the basic products and the food products between the cylinder and the removable container through the dispensing duct, the supply duct, the infeed channel and the outfeed channel.

* * * * *